Dec. 21, 1965  W. O. LINDE  3,224,735
WINCH
Filed May 13, 1963  3 Sheets-Sheet 1
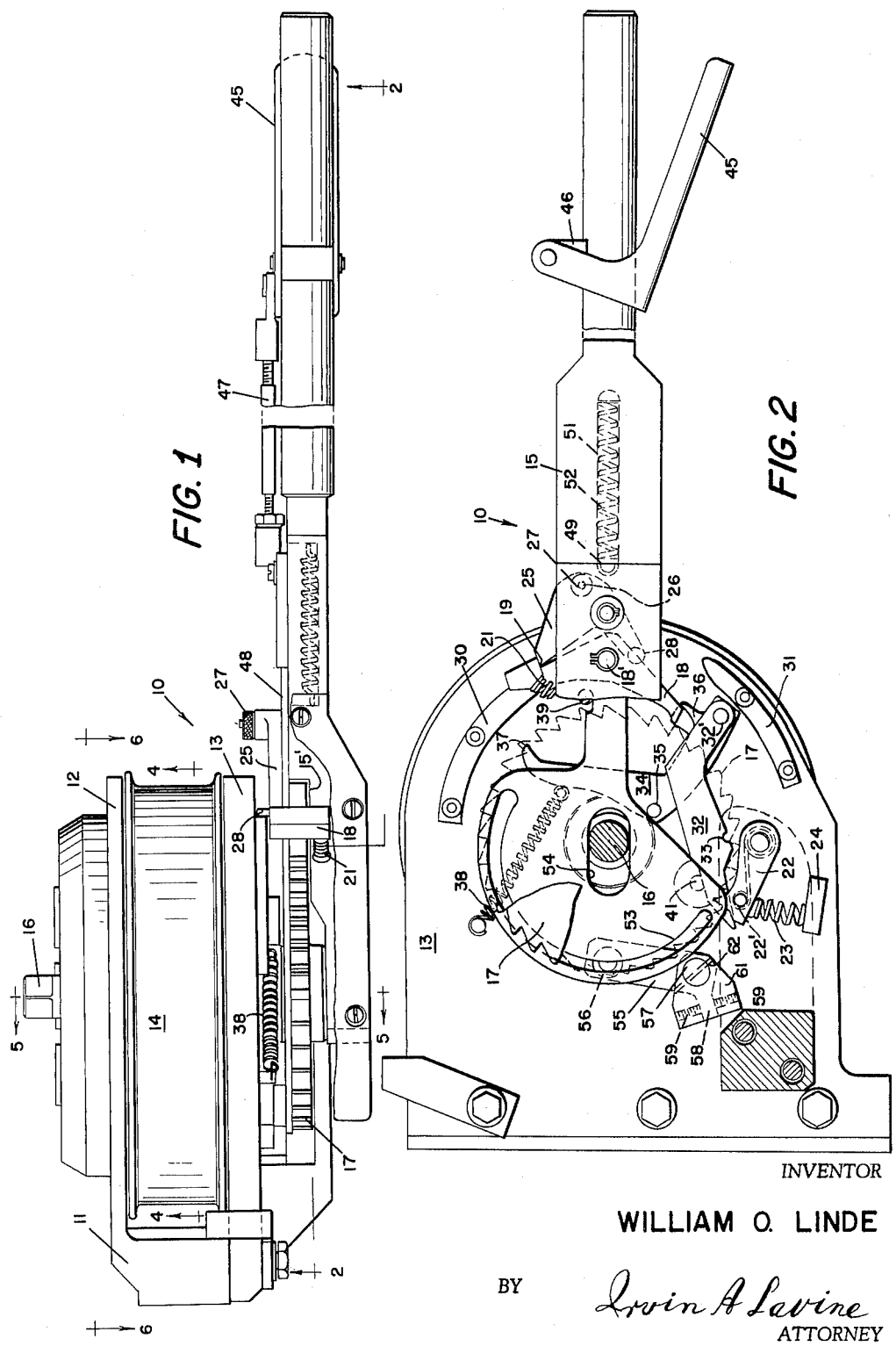
INVENTOR
WILLIAM O. LINDE
BY Irvin A Lavine
ATTORNEY Dec. 21, 1965   W. O. LINDE   3,224,735
WINCH
Filed May 13, 1963   3 Sheets-Sheet 2

INVENTOR
WILLIAM O. LINDE
BY  Irvin A. Lavine
ATTORNEY

Dec. 21, 1965 W. O. LINDE 3,224,735
WINCH

Filed May 13, 1963 3 Sheets-Sheet 3

INVENTOR
WILLIAM O. LINDE
BY Irwin A. Lavine
ATTORNEY

United States Patent Office 3,224,735
Patented Dec. 21, 1965

3,224,735
WINCH
William O. Linde, Baltimore, Md., assignor to Automotive Servicenter, Inc., Baltimore, Md., a corporation of Maryland
Filed May 13, 1963, Ser. No. 279,797
18 Claims. (Cl. 254—167)

The present invention relates to a winch, and more particularly to a winch in which a load may be either raised or lowered to a desired level with great precision of the position thereof, and also to a winch which includes a brake system which must be positively released to permit operation of the winch.

Winches have long been known in which an oscillatable lever is operated to rotate, through the actions of suitable pawls, a ratchet wheel; the ratchet wheel is connected to a drum having a cable thereon which supports a load. These winches have been so constructed that the positions of the pawls could be shifted so that there could be obtained not only a raising of the load through oscillation of the handle, but also a lowering of the load through oscillation of the handle, with the operator applying a resisting force to the handle to thereby lower the load in a controlled manner.

While such winches have been effective for their intended purposes, they have not been altogether satisfactory in meeting more stringent requirements found in certain activities. For example, in some instances it is necessary that relatively heavy objects be exactly positioned with regard to a reference point or plane, and due to environmental factors, the object can only be supported and moved into position by a plurality of winches, each supporting a part of the load. The object must be maintained relatively level at all times, thus requiring that the winches be operated uniformly. Further, because it is necessary that the object be both oriented and positioned with exactitude, it will be seen that these several winches which support it must be capable of exerting a lifting or lowering movement through an extremely small distance.

As a further factor, the object itself may be extremely delicate and valuable, and subject to damage should any undue shock be applied to it. An example of such an object is electronic equipment to be installed at a remote location. Damage to it would require the construction of a new unit and the shipment of that unit over a considerable distance. For this reason, it is necessary that all precautions be taken against the object being subjected to a shock, and this would include, specifically, a falling of the object due either to the inadvertent releasing of a winch handle by a workman, or failure of a pawl or other part of the winch.

It is an object of the present invention to provide a winch which is capable of meeting the requirements set forth above.

Another object of the present invention is the provision of a winch which may be operated to either raise or lower an object through relatively small distances, so as to position the object with exactitude.

Yet another object of the present invention is to provide a winch which will sustain the object should there be either an inadvertent releasing of the handle, or failure of a part of the winch.

A further object of the present invention is the provision of a winch in which there is incorporated a brake system which may be instantly applied by the operator, and which will thereby prevent undesired lowering or falling of the load.

A still further object of the invention is to provide a winch which is of extremely light weight relative to the load to be lifted.

Other objects and many of the attendant advantages of the present invention will be readily understood from the following specification and drawings, wherein:

FIG. 1 is a plan view of a winch in accordance with the present invention, with parts broken away.

FIG. 2 is a cross-sectional view with parts broken away and in phantom, taken on line 2—2 of FIG. 1.

Figure 3:
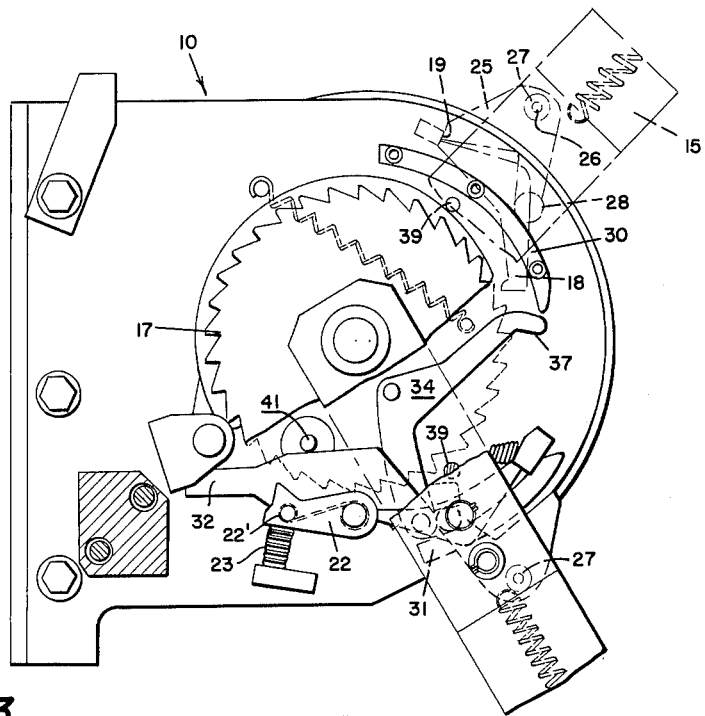
FIG. 3 is a view similar to FIG. 2, with some parts broken away and in different positions.

Referring now to the drawings, wherein like or corresponding reference numerals are used to designate like or corresponding parts throughout the several views, there is shown in FIG. 1 a winch 10 in accordance with the present invention, winch 10 comprising a furcated housing 11 with spaced apart leg members 12 and 13 between which is a drum 14 upon which a cable will be wound. A shaft 16 extends through the drum 14 and the leg members 12 and 13. Handle 15 is a lever which is journaled on shaft 16.

As may be seen from FIGS. 2 and 3, a ratchet wheel 17 is provided, this ratchet wheel 17 being set on the shaft 16. A handle pawl 18 is pivotally connected at 18' to handle 15, and has a locking shoulder 19 thereon. A spring 21 extends between the handle pawl 18 and a portion of handle 15 to urge handle pawl 18 in a clockwise direction.

A hold pawl 22 is pivotally mounted on the leg member 13, and is urged into engagement with the ratchet wheel 17 by a spring 23 which extends between hold pawl 22 and an abutment 24 which is carried by the leg member 13.

Also mounted on handle 15 is a control lever 25; control lever 25 is journaled on a pivot pin 26, and as may be seen from FIG. 1 carries a detent 27. Detent 27 may be seen on FIG. 1, together with a pin 28 which extends from and is carried by control lever 25. In normal operation, in which the ratchet wheel 17 is to be rotated in a clockwise direction, the detent 27 is pulled out and control lever 25 rotated about pivot pin 26 until the control lever pin 28 is in a position generally outwardly or to the right of leg member 13. In this position, control lever 25 is inoperative, and the handle pawl 18 and control pawl 22 will act in normal fashion to cause ratchet wheel 17 to rotate clockwise with handle 15 when it is rotated clockwise, handle pawl 18 ratcheting on ratchet wheel 17 when handle 15 is rotated counterclockwise, hold pawl 22 at this time engaging with ratchet wheel 17 and holding it stationary against the load.

To effect controlled lowering of the load, in which the ratchet wheel 17 is permitted to rotate counterclockwise with handle 15, there are provided fixed cams 30 and 31 secured to the leg member 13. There is also provided a hold pawl cam 32 having a recess 33 on the lower edge thereof, hold pawl cam 32 being pivotally connected at 32' to a hold pawl cam lever 34. Hold pawl cam lever 34 is pivotally connected at 35 to leg member 13, and has on one leg an abutment 36 and on the other leg a nose portion 37. A spring 38 has one end connected to leg member 13 and the other end connected to hold pawl cam lever 34 to urge it in a counterclockwise direction. Also, there is provided a release pin 39 which is carried by handle 15.

Referring now to FIG. 3 to illustrate the operation of the winch 10 during controlled lowering, it will be recalled that initially the control lever 25 is set substantially in the position shown, being free to rotate on pivot pin 26. As handle 15 is moved upwardly, hold pawl 22 will be in engagement with ratchet wheel 17, thereby preventing it from rotating counterclockwise, and during the initial movement from the position shown in FIG. 2 to the upper position shown in FIG. 3, the handle pawl 18 will ratchet on the teeth of ratchet wheel 17. Continued upward movement of handle 15 will cause the pin 28 on control lever 25 to strike the end of cam 30, and control lever 25 will thereby rotate counterclockwise on the pivot pin 26. This movement of control lever 25 will force the upper end thereof to engage with the upper portion of handle pawl 18, thus rotating handle pawl 18 in a counterclockwise direction, against the force of the spring 21. The upper end of control lever 25 will have moved so far in a counterclockwise direction that it will engage under the shoulder 19 of handle pawl 18, and this will prevent the handle pawl 18 from rotating in a clockwise direction; in this position, handle pawl 18 is disengaged from ratchet wheel 17 and is held disengaged by control lever 25.

Upon downward or clockwise movement of handle 15, the ratchet wheel 17 will initially remain motionless, and free movement of handle 15 will be permitted since handle pawl 18 is disengaged. Eventually, however, control lever pin 28 will strike cam 31 and will thereby be caused to rotate in a clockwise direction; this action will remove the upper end of control lever 25 from shoulder 19 of handle pawl 18, and thereby permit the spring 21 to rotate handle pawl 18 in a clockwise direction so that it again engages ratchet wheel 17. There will be a slight raising of the load during continued clockwise movement of handle 15, hold pawl 22 during this movement ratcheting on ratchet wheel 17. Continued clockwise rotation of handle 15 will cause control lever pin 28 to continue its clockwise rotation so that it engages with the lower end of hold pawl cam lever 34 and rides inwardly thereon until it strikes abutment 36. During this portion of the movement, there will be no resistance to the clockwise rotation of control lever 25, whereas movement of hold pawl cam lever 34 will be resisted by spring 38, so that there will be little if any movement of lever 34. On continued movement of the handle 15, control lever pin 28 will cause lever 34 to rotate in a clockwise direction on its pivot pin 35. This will force the hold pawl cam 32 to move to the left, while contacting a fixed guide 41, and hold pawl cam 32 will thereby rotate hold pawl 22 against the force of spring 23 and cause it to be disengaged from the ratchet wheel 17. Recess 33 on hold pawl cam 32 will engage with a pin 22' on hold pawl 22, to thereby hold the hold pawl lever 32 in the position shown in FIG. 3.

Thereafter, and as will be understood, the load will be imposed through ratchet wheel 17 on handle 15, and by slowly permitting handle 15 to rotate counterclockwise, the load will be lowered. Continued upward movement in a counterclockwise direction of handle 15 will bring the release pin 39 into engagement with the nose portion 37 of lever 34, thus causing lever 34 to rotate counterclockwise and to withdraw hold pawl cam 32 to the right and release hold pawl 22 so that it now engages ratchet wheel 17 and holds the load. The handle pawl 18 will ratchet on ratchet wheel 17 until engagement of control lever pin 28 with cam 30 to disengage handle lever 18 in the manner above set forth.

A brake system is provided which includes, as shown in FIGS. 1 and 2, a grip member 45 pivotally secured to ears 46 on the handle 15, and having connected to it an adjustable link 47. Link 47 is connected to an operating slide 48 having a laterally extending lug 49 adjacent its rear end. Lug 49 enters into a recess 51 in handle 15, and acts against a spring 52 in recess 51, spring 52 being relatively strong and urging operating slide 48 to the left as shown in FIGS. 1 and 2.

At its forward end, operating slide 48 is generally sector-shaped, having an arcuate slit 53 and a slot 54 which receives the shaft 16. A brake lever 55 has a follower 56 journaled to it and extending into arcuate slot 53. Brake lever 55 is journaled on a brake cam shaft 57 (see also FIG. 5) and has an extension 58. A pair of adjustment screws 59 engage extension 58, these screws 59 being carried in a block 61 which is secured to the shaft 57, as by the pin 62.

Figure 4:
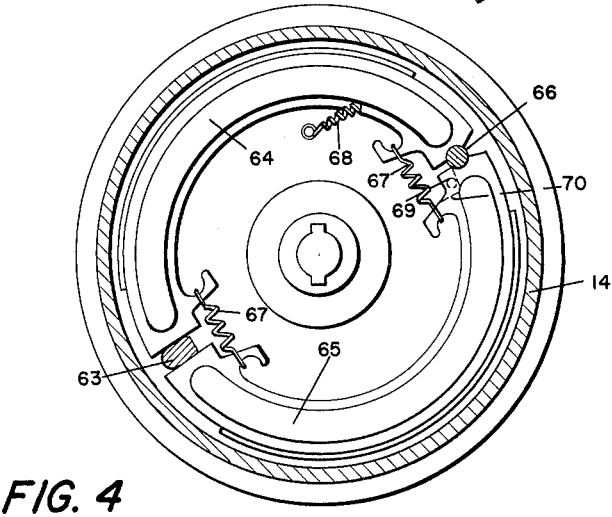
FIG. 4 is a cross-sectional view taken on line 4—4 of FIG. 1, showing the brake.
Figure 5:
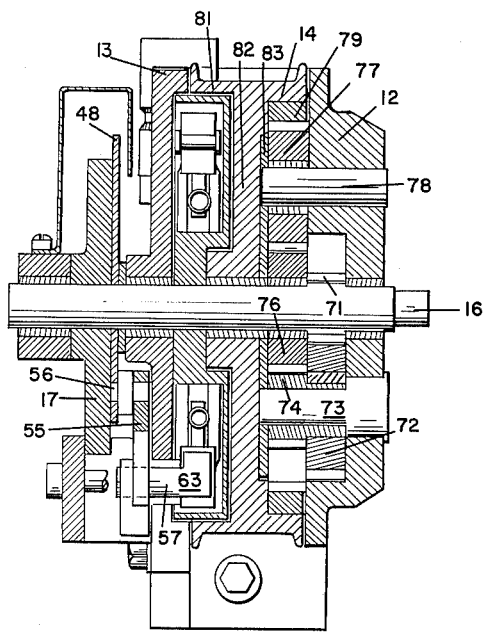
FIG. 5 is a cross-sectional view taken on line 5—5 of FIG. 1.

Referring now to FIGS. 4 and 5, the shaft 57 extends through the leg member 13, and has on the end thereof a brake operating cam 63. Cam 63 is received between ends of a pair of generally semi-circular brake shoes 64, 65, which are located within the drum 14 and are separated by a freely floating pin 66 at their opposite ends. Relatively weak springs 67 serve to draw the brake shoes 64 and 65 towards each other. A centering spring 68 is connected to brake shoe 64 and a brake centering pin 69 extends into a guide slot 70 in brake shoe 65.

With the parts in the position shown in FIGS. 1 and 2, the grip member 45 is in a position away from the handle 15, as it, link 47 and operating slide 48 are urged to the position shown by the relatively strong spring 52. The brake operating cam 63 is in an inclined position, relatively to the position in FIG. 4, and so the brake shoes 64 and 65 are in engagement with the interior surface of drum 14. Consequently, drum 14 may not rotate. In order to permit drum 14 to rotate, it is necessary to grasp the grip member 45 and to move it to a position adjacent the handle 15, against the urging of spring 52. This will cause the brake operating slide 48 to be moved to the right as permitted by the slot 54, and the follower 56 will thereby be drawn inwardly towards the shaft 16. As will be understood, this action can take place in any position of handle 15 due to the arcuate extent of slit 53. Follower 56 will thereby cause lever 55 to rotate and to consequently rotate the block 61 and the shaft 57. This will then move the brake cam 63 to the position shown in FIG. 4, and the relatively weak springs 67 and spring 68 will thereby be enabled to withdraw the brake shoes 64 and 65 from engagement with drum 14. Adjustment of this brake system may be effected by manipulating adjusting screws 59 to thereby change the relative orientation of lever 55 and shaft 57.

It will also be seen that upon release of grip member 45, in any position of handle 15, the brake shoes 64 and 65 will be driven against the drum 14 by spring 52, operating the slide 48, lever 55, shaft 57 and cam 63. Also, it is necessary to actuate the grip member 45 to bring it into a position close to handle 15 in order to release the brake shoes 64 and 65 to permit rotation of the drum 14.

Figure 6:
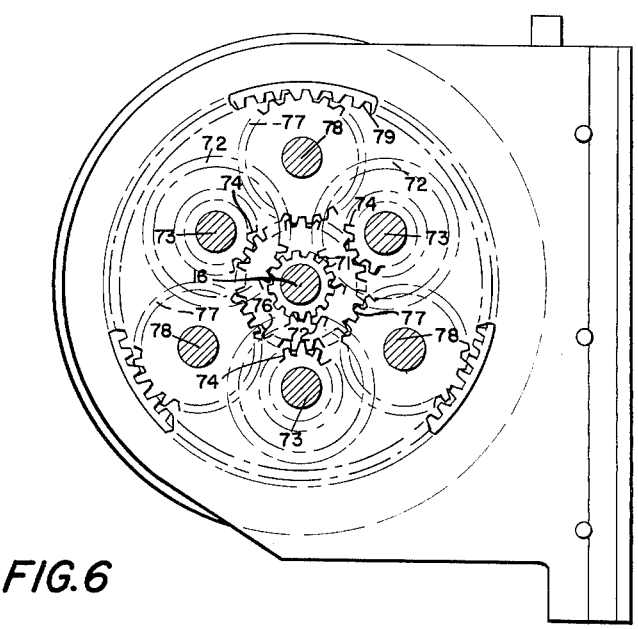
FIG. 6 is a cross-sectional view taken on line 6—6 of FIG. 1, showing gearing.

Referring now to FIGS. 5 and 6, the shaft 16 is fixed to ratchet wheel 17, and is journaled in the legs 12 and 13. Near its outer end, shaft 16 has thereon a pinion 71 which is in mesh with three pinions 72 secured to three shafts 73. At their inner ends, the shafts 73 have secured thereto pinions 74 which are in mesh with an idler 76 journaled on shaft 16. Idler 76 in turn drives three pinions 77 carried on three shafts 78, pinions 77 being in mesh with the idler 76, and also with the ring gear 79 which is secured to the drum 14. A spider 83 is provided to hold the inner ends of the shafts 73 and 78 to prevent any movement of the shaft ends under load. By the construction described, motion is transferred from shaft 16 to drum 14.

Drum 14 may be seen in FIG. 5 to comprise a cylinder 81 having a discoidal web 82 intermediate the ends of cylinder 81. There is thereby provided a pair of chambers, and as will be understood the ring gear 79 is secured to drum 14 and is in one of the chambers on the interior of cylinder 81. Also, the idlers 76 and gears 77 are in the chamber, as is shown in FIG. 5. In the other chamber of the drum 14 there are the brake shoes 64 and 65, as well as the brake operating cam 63. This construction thereby provides a highly compact organization of parts.

There has been provided a winch construction which is relatively economical to manufacture, requiring a minimum number of parts and being of very light weight relative to the load to be handled. With the winch as herein provided, setting of the winch for either normal raising operations or controlled lowering operations is readily accomplished by the manipulation of a single control lever. Positive engagement of one or the other of the pawls is insured during either operation and during any phase of either operation.

There has also been provided herein a winch having a brake or release system which must be positively actuated by the operator in order to permit movement of the winch drum, and which may be instantaneously released by the operator to prevent movement of the winch drum. In addition, a sturdy and compact gearing system has been provided to achieve suitable mechanical advantage and easily manageable handle loads.

It will be obvious to those skilled in the art that various changes may be made without departing from the spirit of the invention and therefore the invention is not limited to what is shown in the drawings and described in the specification but only as indicated in the appended claims.

What is claimed is:

1. In a winch, a ratchet wheel, a hold pawl engageable with said ratchet wheel, a handle lever having a feed pawl thereon engageable with said ratchet wheel, a drum operatively connected with said ratchet wheel, brake means in juxtaposition with said drum, a grip member on said handle lever, linkage means for connecting said brake means and said grip member for release of said brake means upon gripping of said grip member in any operative position of said handle lever, and spring means for urging said brake means into engagement with said drum, whereby said brake means may be disengaged from said drum upon gripping of said grip member.

2. A winch as set forth in claim 1, and further including a shaft for said ratchet wheel, said linkage means comprising an operating slide having a slot therein, said shaft passing through said slot.

3. In a winch, a ratchet wheel, a hold pawl engageable with said ratchet wheel, a handle lever having a feed pawl thereon engageable with said ratchet wheel, a drum operatively connected with said ratchet wheel, brake means in juxtapostion with said drum, a grip member on said handle lever, linkage means for connecting said brake means and said grip member for release of said brake means upon gripping of said grip member, said linkage means including an operating slide having an arcuate slit therein, a lever having a follower in said slit, brake means operating means connected to said lever, and spring means for urging said brake means into engagement with said drum, whereby said brake means may be disengaged from said drum upon gripping of said grip member.

4. In a winch, a drum, a rotatable handle having a grip member thereon, means operatively connecting said handle with said drum for rotation of said drum upon oscillation of said handle, brake means engageable with said drum, means for urging said brake means into engagement with said drum, and means for connecting said grip member and said brake means in any operative position of said handle lever to affect release of said brake means upon actuation of said grip member.

5. In a winch, a rotatable member, means for rotating said rotatable member including a handle lever, a moveable grip member on said handle lever, releasable means for preventing rotation of said rotatable member, and means connecting said grip member with said last mentioned means in any operative position of said handle lever whereby to permit rotation of said rotatable means upon gripping of said grip member.

6. In a winch as set forth in claim 5, means for urging said rotation preventing means into operative position.

7. A winch comprising a rotatable drum, a ratchet wheel, means operatively connecting said ratchet wheel to said drum for rotational movement, a spring-urged hold pawl for said ratchet wheel, an oscillatable handle lever having a spring-urged feed pawl thereon, first and second cam means on said winch, a control lever pivoted on said handle lever and engageable with said feed pawl and with said first cam means during movement of said handle lever in a first direction to disengage said feed pawl, a hold pawl cam lever pivoted on said winch and rotatably carrying a hold pawl cam, said control lever on movement of said handle lever in a second direction contacting said second cam means to thereby engage said feed pawl and thereafter contacting said hold pawl cam lever to move said hold pawl cam into contact with said hold pawl to disengage said hold pawl, a release pin on said handle lever engaging said hold pawl cam lever to withdraw said hold pawl cam from said hold pawl during movement of said handle lever in the first direction prior to said engagement of said control lever with said first cam means.

8. A winch as set forth in claim 7, said connecting means comprising a gear train between said ratchet wheel and said drum.

9. A winch as set forth in claim 7, said connecting means comprising a drive shaft on said ratchet wheel, a pinion on said drive shaft, first shaft means having gear means thereon meshing with said drive shaft pinion and having second gear means thereon, an idler gear on said drive shaft meshing with said second gear means, second shaft means having gear means thereon meshing with said idler gear, and a ring gear on said drum meshing with said gear means on said second shaft.

10. A winch as set forth in claim 7, and including brake means engaging a movable part of said winch, a grip member on said handle lever, and means connecting said grip member to said brake means for releasing said brake means upon gripping of said grip member.

11. A winch comprising housing means, a rotatable drum journaled on said housing means, a ratchet wheel connected with said drum, a hold pawl for said ratchet wheel, an oscillatable handle lever having a feed pawl thereon, brake means engaging a movable part of said winch, a grip member on said handle lever, and means connecting said grip member to said brake means in any operative position of said handle lever for releasing said brake means upon gripping of said grip member.

12. The winch of claim 11, said part of said winch being said drum.

13. The winch of claim 12, said brake means comprising a brake shoe adjacent said drum, and means for urging said brake shoe into engagement with said drum.

14. A winch comprising a rotatable drum, a ratchet wheel connected with said drum, a hold pawl for said ratchet wheel, an oscillatable handle lever having a feed pawl thereon, brake shoe means interiorly of said drum, actuating means for said brake shoe means, a grip member on said handle lever, means connecting said grip member and said actuating means in any operative position of said handle lever, and spring means urging said actuating means into position to engage said brake shoe means with said drum and urging said grip member away from said handle lever.

15. The winch of claim 14, said winch comprising a main drive shaft, said handle lever being journaled on said main drive shaft and said connecting means including a slide bar having a slot therein receiving said main drive shaft.

16. The winch of claim 15, said slide bar having an arcuate slot therein, a follower in said slot, and means connecting said follower with said actuating means.

17. A winch comprising a rotatable drum, a ratchet wheel, means operatively connecting said ratchet wheel to said drum for rotational movement, a spring-urged hold pawl for said ratchet wheel, an oscillatable handle lever having a spring-urged feed pawl thereon, a control lever on said handle lever moveable to contact said feed pawl to disengage said feed pawl, first fixed cam means contacted by said control lever during first swinging movement of said handle lever to engage said feed pawl with said ratchet wheel, hold pawl cam means engageable by said control lever during continuation of said first swinging movement of said handle lever for disengaging said hold pawl, means on said handle lever for contacting said hold pawl cam means to withdraw said hold pawl cam means from said hold pawl to engage said hold pawl after second swinging movement of said handle lever, and second fixed cam means contacted by said control lever after engagement of said hold pawl to cause said control lever to disengage said feed pawl.

18. The winch of claim 17, said hold pawl cam means comprising a hold pawl cam lever pivoted on said winch and having a hold pawl cam pivoted thereon, said hold pawl cam lever being engaged by said handle lever contacting means.

References Cited by the Examiner
UNITED STATES PATENTS

| | | | |
|---|---|---|---|
| 1,445,151 | 2/1923 | Mercer | 254—187 |
| 1,579,483 | 4/1926 | Joyce. | |
| 2,269,438 | 1/1942 | Coffing | 254—171 |
| 2,719,696 | 10/1955 | Palka | 254—146 |
| 2,890,857 | 6/1959 | Hoffman | 254—167 |

SAMUEL F. COLEMAN, *Primary Examiner.*